United States Patent [19]

Miyao et al.

[11] 3,842,692

[45] Oct. 22, 1974

[54] OPERATION CONTROL METHOD FOR A SPLIT-TYPE HYDROSTATIC POWER TRANSMISSION

[75] Inventors: Takayuki Miyao; Hiroaki Maeda, both of Toyota; Masanori Sato, Nagoya, all of Japan

[73] Assignee: Aisin Seiki Co. Ltd., Aichi-ken, Japan

[22] Filed: Apr. 6, 1973

[21] Appl. No.: 348,537

[30] Foreign Application Priority Data
Apr. 7, 1972   Japan.................. 47-35408

[52] U.S. Cl..................... 74/786, 192/4 B, 60/327
[51] Int. Cl................................................. F16h 3/44
[58] Field of Search ............ 60/327, 435, 437, 438, 60/439, 469; 192/4 B; 74/786, 710

[56] References Cited
UNITED STATES PATENTS
2,311,691  2/1943  Porter............................. 74/786 X
3,505,908  4/1970  Herrmann....................... 74/786 X FOREIGN PATENTS OR APPLICATIONS
223,614  5/1968  U.S.S.R............................. 192/4 B Primary Examiner—Edgar W. Geoghegan
Attorney, Agent, or Firm—Oblon, Fisher, Spivak, McClelland & Maier

[57] ABSTRACT

An operation control method for a split-type, hydrostatic power transmission connecting an input shaft to an output shaft through a differential hydrostatic unit, and selectively connecting another hydrostatic unit, connected to the differential hydrostatic unit by means of a hydrostatic circuit, to either of the input and output shafts by a switch connecting means, includes the steps of measuring the relation between the ratio of the displacement of the other hydrostatic unit to the displacement of the differential hydrostatic unit under liquid leakage conditions, and the ratio of the rotary speed of the output shaft to the rotary speed of the input shaft in each case wherein the other hydrostatic unit is connected to either the input or output shaft, and switching the connection of the other hydrostatic unit from either the input shaft to the output shaft or vice versa at the time when the speed ratio attains a variation value which is less than that of a reference speed ratio of zero of the rotary shafts associated with the differential hydrostatic unit.

5 Claims, 14 Drawing Figures

3,842,692

OPERATION CONTROL METHOD FOR A SPLIT-TYPE HYDROSTATIC POWER TRANSMISSION

BACKGROUND OF THE INVENTION

Field of the Invention:

The present invention relates generally to an operation control method for a split-type hydrostatic power transmission in which an input shaft and an output shaft are connected through a differential hydrostatic unit and another hydrostatic unit which is connected through means of a hydrostatic circuit to the differential hydrostatic unit, the units being selectively connected to either of the input or output shafts by a switching means and wherein the displacement of at least one of the units is variable.

SUMMARY OF THE INVENTION

It is an object of the present invention to provide an operation control method for a split-type hydrostatic power transmission wherein shocks caused by means of transmission mode conversion may be prevented.

The object of this invention can be attained by providing an operation control method for a split-type hydrostatic power transmission in which an input shaft is connected to an output shaft through a differential hydrostatic unit and selectively connecting another hydrostatic unit, connected to the differential hydrostatic unit by means of a hydrostatic circuit, to either the input shaft or the output shaft by a switch connecting means, which comprises the steps of measuring the relation between the ratio of the displacement of the other hydrostatic unit to the displacement of the differential hydrostatic unit under liquid leakage conditions, and the ratio of the rotary speed of the output shaft to the rotary speed of the input shaft, in each case wherein the other hydrostatic unit is connected to either the input shaft or the output shaft, and switching the connection of the other hydrostatic unit from either the input shaft to the output shaft or from the output shaft to the input shaft at the time when the speed ratio is not altered by means of switching the connection or when the speed ratio variation is less than that of a reference speed ratio of zero of the rotary shafts associated with the differential hydrostatic unit. The operation control can be attained by providing the split-type hydrostatic power transmission with suitable gearing having a gear teeth ratio iM in/iM out.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENTS

Figure 1:
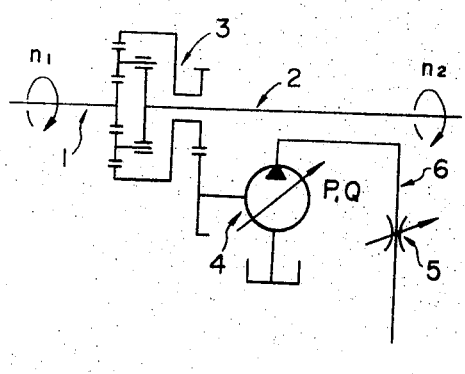
FIG. 1 is a schematic view of a clutch structure having a hydrostatic pump motor.

Referring now to the drawings, and more particularly to FIG. 1 thereof, there is shown a differential gear set having three variables or degrees of freedom, the set forming a displacement type clutch wherein the sun gear of the set is connected to a first shaft which serves as an input drive shaft 1, a planetary gear carrier is connected to a second shaft which serves as an output driven shaft 2 which is coaxially aligned with shaft 1, and the ring gear is fluidically connected to a hydrostatic pump 4 by means of a suitable hydraulic brake band. When the input shaft 1 is driven while a load is being impressed upon the output shaft 2, the hydrostatic pump 4 will begin to rotate so as to pump fluid at the flow rate Q. The volume flow rate Q is controlled by means of a flow rate control valve 5 and as the pump 4 pumps fluid, a working pressure P is generated at the output 6 of hydrostatic pump 4 whereby the hydrostatic pump 4 fludically actuates the brake band of the differential gear set 3 whereby the mechanical output of the input shaft 1 may be transmitted to the output shaft 2 by means of the generated reaction force.

The ratio e of the rotary speed $n_2$ of the output shaft 2 to the rotary speed $n_1$ of the input shaft 1, (hereinafter referred to as the speed ratio) is thus changed by changing the volume flow rate Q by means of the flow rate control valve 5, the hydrostatic energy generated from the hydrostatic pump 4 of course being the product of the working pressure P and the volume flow rate Q. With the gear set of FIG. 1 however, hydraulic energy is lost.

Figure 2:
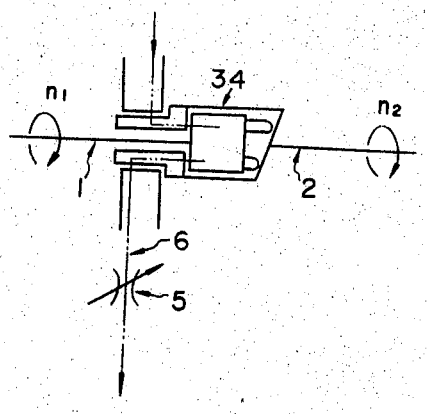
FIG. 2 is a schematic view of another clutch structure having a hydrostatic pump motor.

The aforementioned transmission performance can be attained, without using a differential gear set, as shown in FIG. 2, wherein one shaft of a hydrostatic pump 34 having a differential operation of two degrees of freedom and operating as a pump motor, is connected to the input driving shaft 1 while the other shaft is connected to the output driven shaft 2. As is similar with the apparatus of FIG. 1, when a load is impressed upon the output shaft 2, fluid is pumped from the differential-type hydrostatic pump 34 at a volume flow rate Q due to the relative movement between the input shaft 1 and the output shaft 2. The volume flow rate is controlled by the flow rate control valve 5, and as the pump 34 operates, a working hydrostatic pressure P is generated at the output 6 of the differential-type hydrostatic pump 34 whereby a driving torque is generated so as to transmit mechanical power to the output shaft 2.

Figure 3:
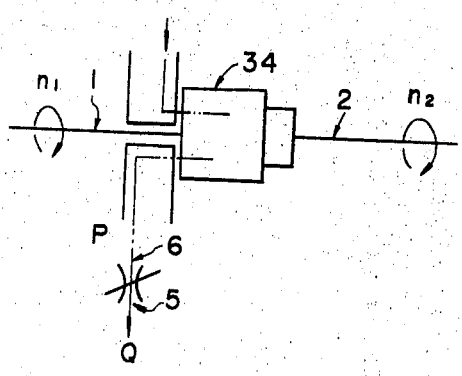
FIG. 3 is a schematic view of still another clutch structure utilizing both of the clutch structures of FIGS. 1 and 2.

The structures of FIGS. 1 and 2 may be further combined so as to comprise the structure shown in FIG. 3. In such structure, a differential hydrostatic unit 34 generates hydrostatic power P·Q due to the relative movement between the input shaft 1 and the output shaft 2. The differential hydrostatic unit 34 of course provides a pumping operation under the conditions wherein a fluid flows at the volume flow rate Q, and when the displacement of the differential hydrostatic unit, i.e., the pumping operation ceases, then all input power is being transmitted to the output shaft, assuming the neglect of any losses, and the condition of direct drive is attained. The speed ratio under such condition is referred to as the reference speed ratio $e_c$. Assuming the condition wherein the fluid, having a volume flow rate Q, is supplied to the differential hydrostatic unit 34, and wherein no fluid leakage from the differential hydrostatic unit 34 is found, the condition can be given as $e > e_c$ and consequently, the differential hydrostatic unit 34 provides a motor operation.

The term "split-type power hydrostatic transmission" means a system for effectively utilizing energy wherein (1) the hydrostatic energy lost from a differential hydrostatic unit, such as the unit 34, is recovered as mechanical energy and recycled to the apparatus such as is shown in FIG. 3, or (2) another hydrostatic unit for converting mechanical energy to hydrostatic energy from another part of the differential hydrostatic unit is utilized so as to give such energy to the differential hydrostatic unit 34. The effects corresponding to a flow rate control valve can be provided by using a variable displacement-type hydrostatic unit. The system connecting the hydrostatic unit to the input shaft is referred to as an output split-type, while the system connecting the hydrostatic unit to the output shaft is referred to as an input split-type. Both forms of split-type hydrostatic transmissions are known. The fact that the power transmitting efficiency can be shown in the same manner as in the systems shown in FIGS. 1 and 2, is disclosed in "Kikai Kenkyu" Volume 15 No. 1, Pages 107–117.

Figure 4:
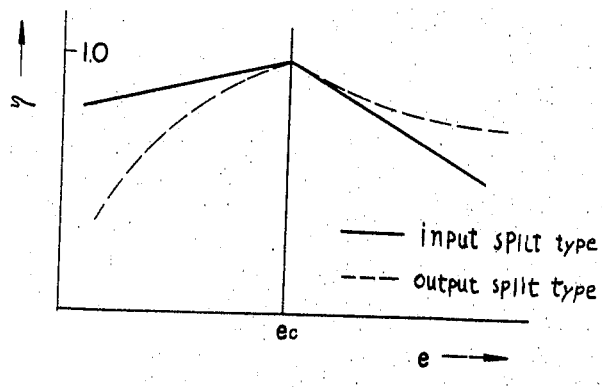
FIG. 4 is a conventional power transmitting efficiency-speed ratio characteristic graph.

As stated above, the known theoretical equation of the power transmission efficiency $\eta$ can be shown in principle, as in FIG. 4. Assuming that no mechanical losses are present, and that the flow of hydrostatic energy is zero at the point $e_c$, the equation $\eta = 1.0$ is given at a point $e_c$ of FIG. 4. The ratio of the displacement $D_N$ of the other hydrostatic unit to the displacement $D_S$ of the differential hydrostatic unit ($\delta = D_N/D_S$) can be shown as in FIG. 5. In such figure, the displacement ratio $\delta = 0$ in both the input split-type and the output split-type transmissions at the point $e_c$. $D_S$ is maximized so as to render $\delta$ zero in order to keep the working pressure low and to decrease the losses of hydrostatic energy upon both sides of the point $e_c$. From this analysis, it may be seen that the input split-type transmission imparts higher power transmitting efficiency $\iota$ within the range $0 < e < e_c$ while the output split-type transmission imparts higher power transmitting efficiency $\eta$ within the range $e_c < e$, $e_c$ being the turning point, when it is assumed that no leakage occurs.

Figure 5:
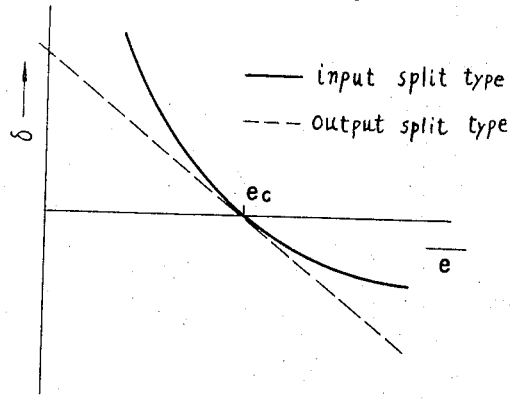
FIG. 5 is a conventional displacement ratio-speed ratio characteristic graph.

Moreover, as seen from FIG. 5, the displacement ratio $\delta$ of the input split-type transmission is equal to the displacement ratio $\delta$ of the output split-type transmission at the point $e_c$. Accordingly, even though the connection of the other hydrostatic unit is converted from the input shaft to the output shaft or from the output shaft to the input shaft, by a suitable clutch means, no discontinuity in speed variation is found, whereby high power transmitting efficiency can nevertheless be obtained within a broad range. Heretofore, such principles have been considered, and in accordance with the present invention, the practical losses are considered under the above idealistic conditions and the following facts are found both from theory and experimentation. The speed ratio e at the point wherein the power transmitting efficiency of the output split-type transmission becomes higher than the power transmitting efficiency of the input split-type transmission, is not in fact $e \geq e_c$ but in fact $e \geq 0.75\, e_c - 0.9\, e_c$ and the point $\delta = 0$ is within a range $e < e_c$. This invention then is to provide lower shock or vibration when the switching operation is performed than that of conventional mode switching systems, at the point $e_c$, of the power transmission.

In accordance with the conventional considerations of the idealistic conditions wherein hydrostatic energy is not conducted to the other hydrostatic unit and where no mechanical losses are found at the reference speed ratio $e_c$, it is then apparent that the other hydrostatic unit is not utilized at the point $e_c$, whereby, the efficiency is dependent solely upon the clutching mechanism without any connection to the input split-type or the output split-type transmission. That is, the efficiency of the input split-type transmission is equal to that of the output split-type transmission under such speed control conditions. However, from a practical view point, such conventional considerations cannot be applied as the hydrostatic unit does in fact have leakage losses and torque losses.

When, for example, the apparatus of FIG. 3 is operated at the reference speed ratio $e_c$, only the torque loss $\Delta T_N$ of the other hydrostatic unit is considered by assuming there is no leakage loss from the differential hydrostatic unit and the other hydrostatic unit. In this case, since leakage is not considered, the displacement $D_N$ of the other hydrostatic unit is zero as illustrated in FIG. 5. In the instance where the input split-type transmission connects the other hydrostatic unit to the output shaft 2, the relation between the operational hydrostatic pressure $P_{in}$ generated within the differential hydrostatic unit and the torque $T_1$ of the input shaft is expressed as follows:

$$P_{in} = A \cdot T_1/D_S \tag{1}$$

wherein A represents a constant determined by the relation of the mechanical connection of the differential apparatus 34. In the equation, any effect of the other hydrostatic unit is not considered.

In the instance where the output split-type transmission connects the other hydrostatic unit to the input shaft 1, the relation between the operational hydrostatic pressure $P_{out}$ generated within the differential hydrostatic unit and the torque $T_1$ of the input shaft is expressed as follows, because the torque loss $\Delta T_N$ of the other hydrostatic unit is subtracted from $T_1$ when the pressure is applied to the differential hydrostatic unit:

$$P_{out} = A \cdot (T_1 - \Delta T_N/D_S) \tag{2}$$

In both the input split-type and output split-type systems, A is the same and the displacement $D_S$ of the differential hydrostatic unit 34 is the same. Accordingly, when the torques of the input shaft are the same, the operational pressure $P_{in}$ is expressed as follows at the reference speed ratio $e_c$ because of the torque loss $\Delta T_N$:

$$P_{in} > P_{out} \quad (3)$$

When all leakage losses within the circuit comprising the differential hydrostatic unit and the other hydrostatic unit are considered, the displacement of the differential hydrostatic unit terminates at the point $e_c$. That is, as the other hydrostatic unit maintains the operational hydrostatic pressure at the value present when the displacement of the differential hydrostatic unit terminates, a displacement $D_N$, representing a pumping operation, is required so as to compensate for such leakage losses. The torque $T_N$ of such other hydrostatic unit required under such circumstances, is expressed as follows:

$$(T_N = -D_N \cdot P_{out}/2\pi) + \Delta T_N \quad (4)$$

wherein $D_N$ is shown by a negative value due to the pumping operation, and when such displacement represents a motor operation, $D_N$ is shown by a positive value, whereby $T_N$ can be commonly considered as the torque representative of either the pumping operation or the motor operation.

As stated above, the operational pressure $P_{in}$ is not affected by the other hydrostatic unit in the instance of the input split-type system. However, it is necessary to subtract the equation component $(-D_N \cdot P_{out}/2\pi)$ from the input shaft torque $T_1$ due to the consideration of leakage losses within the output split-type system:

$$P_{out} = [A \cdot (T_1 + D_N \cdot P_{out}2/\pi - \Delta T_N)/D_S]$$

or $$P_{out} = [A \cdot (T_1 - T_N)/D_S(1 - A/2\pi \cdot \delta] \quad (5)$$

The operational pressure $P_{out}$ of the output split-type system is thus lower in value when compared with that of the input split-type system. In the equation, it will be noted that the component $D_N$ in $(D_N P_{out}/2\pi)$ was of a negative value, and that the component $\delta$ in $(A/2\pi \cdot \delta)$ was also of a negative value because the other hydrostatic unit imparts a pumping operation.

In the above analysis then, a certain amount of leakage loss within the hydrostatic circuit has been considered. It is of course well-known that such leakage losses increase proportional to an increase in the rotary speed of the hydrostatic unit and also an increase in the operatonal pressure P. In the instance where the same speed ratio is present, the rotary speed of the differential hydrostatic unit is the same in both the input split-type and the output split-type systems as long as the rotary speed of the input shaft is maintained constant. On the other hand, when considering the rotary speed $n_N$ of the other hydrostatic unit, when such speed is altered within the speed ratio $e^*$ under mode conversion conditions, such as when changing the connection from the input split-type to the output split-type system, or from the output split-type to the input split-type system, a shock is propagated. Accordingly, the embodiment of FIG. 6 is considered under such mode conversion conditions.

Figure 6:
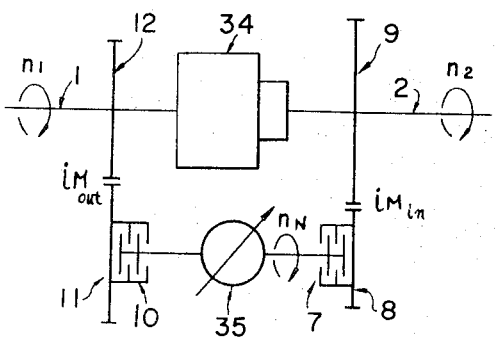
FIG. 6 is a schematic view of a split-type hydrostatic power transmission to which the method of this invention is applied.

Referring now to FIG. 6, which is an improvement of the displacemet type clutch shown in FIG. 3, another hydrostatic unit 35 having the same function as the flow rate control valve 5 is connected through gears 8 and 9 to the output shaft 2 by means of a clutch 7 or through gears 11 and 12 to the input shaft 1 by means of a clutch 10. The ratio of the gear teeth of the gear 8 to the gear 9 is designated as "iM in" and the ratio of the gear teeth of the gear 11 to the gear 12 is designated as "$iM_{out}$". During the conversion from the input split-type to the output split-type system or from the output split-type to the input split-type system, it is preferale that the relative speed between the clutch 7 and the clutch 10 be zero.

In order for such relative speed to be zero, a relation of iM to the speed ratio $e^*$ of the input shaft rotary speed $n_1^*$ to the output shaft rotary speed $n_2^*$ at the time of synchronizing the clutch, can be expressed as follows:

$$n_N^* = iM \text{ in} \cdot n_2^* = iM \text{ out} \cdot n_1^*$$

or $$e^* = iM \text{ out} / iM \text{ in} \quad (6)$$

Consequently, in the structure having the speed ratio $e^*$, the rotary speed $n_N^*$ of the other hydraulic unit 35 is the same whether it be within the input split-type or within the output split-type system. Heretofore, $e^*$ has corresponded to the reference speed ratio $e_c$ which has been previously studied.

In such structure, the rotary speed of the other hydrostatic unit is the same at the point $e_c$ in both the input split-type and the output split-type system. On the other hand, the operational pressure P of the input split-type is higher than that of the output split-type transmission at the point $e_c$. Accordingly, the leakage loss $\Delta Q$ at the point $e_c$ is expressed as follows:

$$\Delta Q \text{ in} > \Delta Q \text{ out} \quad (7)$$

The auxiliary reference of "in" or "out" represents the input split-type and the output split-type systems, respectively. The hydrostatic energy can of course be expressed by the product of the operational pressure P and the flow rate Q, and the loss $h_L$ of the hydrostatic energy due to leakage losses can be expressed as follows:

$$h_L = P \times \Delta Q$$

The loss of hydrostatic energy at the point $e_c$ may be expressed as follows from the relationship of equations (3) and (7):

$$h_L \text{ in} = P_{in} \cdot \Delta Q_{in} > h_L \text{ out} = P_{out} \cdot \Delta Q_{out} \quad (8)$$

The torque loss $\Delta T_N$ of the hydrostatic unit increases proportional to an increase in the rotary speed or an increase in the operational pressure, and the same is true of the leakage losses. The rotary speed of each hydrostatic unit in the input split-type system is equal to that of the output split-type system, at the point $e_c$. The operational pressure P of the input split-type system is higher than that of the output split-type system, and accordingly, $$\Delta T_X \text{ in} > \Delta T_S \text{ out}$$
$$\Delta T_N \text{ in} > \Delta T_N \text{ out}$$

within each hydrostatic unit.

The mechanical energy loss $m_L$ caused by the torque loss can be expressed as a function of the angular speed of each hydrostatic unit $w_S$ and $w_N$ and each torque loss $\Delta T_S$ and $\Delta T_N$. Accordingly, the mechanical energy loss at the point $e_c$ is expressed as follows:

$$m_L \text{ in} = \Delta T_S \text{ in} \cdot w_S + \Delta T_N \text{ in} \cdot w_N > m_L \text{ out} = \Delta T_S \text{ out} \cdot w_S + \Delta T_N \text{ in} \cdot w_N \quad (9)$$

wherein the auxiliary reference S represents the differential hydrostatic unit 34, and the reference N represents the other hydrostatic unit 35. The total energy loss $E_L$ is of course equal to the sum of the mechanical loss energy $m_L$ and the hydrostatic energy loss $h_L$. Accordingly, such may be expressed, at the reference speed ratio $e_c$, from consideration of equations (8) and (9) as follows:

$$E_L \text{ in} > E_L \text{ out} \quad (10)$$

In the known theoretical equation disclosed in the aforementioned prior art "Kikai Kankyu", it was suggested that the power transmitting efficiency $\eta$-in of the input split-type system has a certain definite value at $e=0$. At the reference speed ratio $e_c$, it was additionally suggested that a certain amount of energy loss was present. As a practical problem, the loss must not be the total input shaft energy, and consequently, the certain definite value $\beta$in is given. On the other hand, the power transmitting efficiency $\beta$ out is zero at $e=0$ in the output split-type system so that the power transmitting efficiency always increases to the point $e_c$, in accordance with the disclosure of the prior art.

Figure 7:
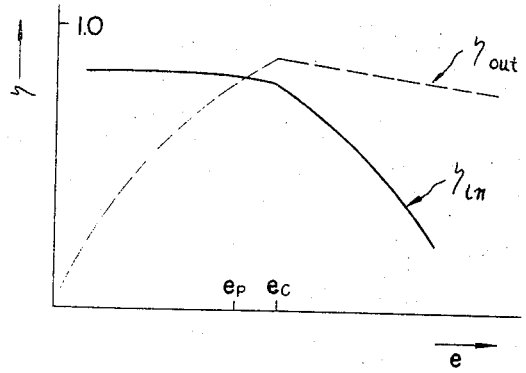
FIG. 7 is a power transmitting efficiency-speed ratio characteristic graph in which liquid leakage and mechanical losses are considered.
Figure 8:
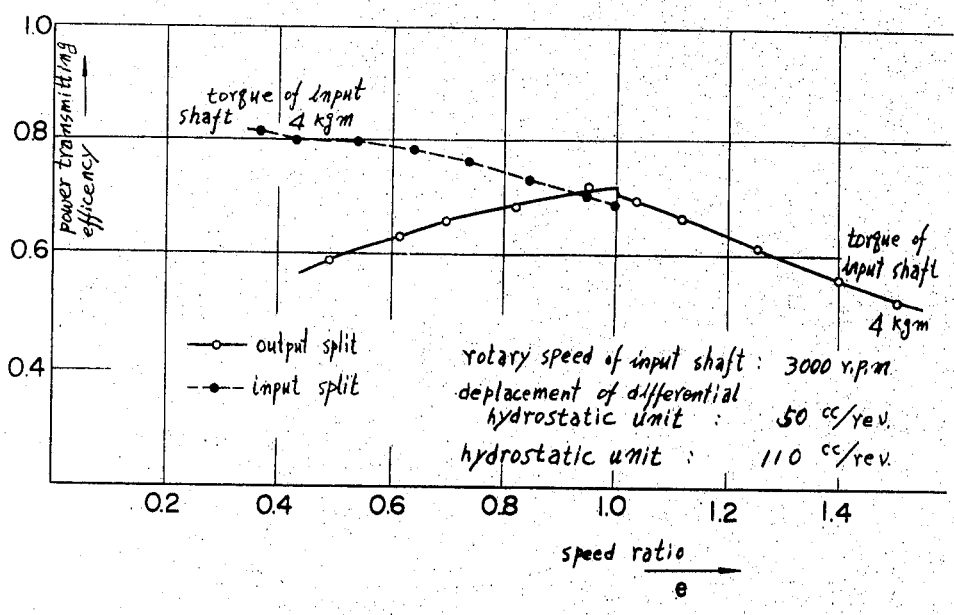
FIGS. 8 to 12 are power transmitting efficiency-speed ratio characteristic graphs derived as a result of experimentation.
Figure 9:
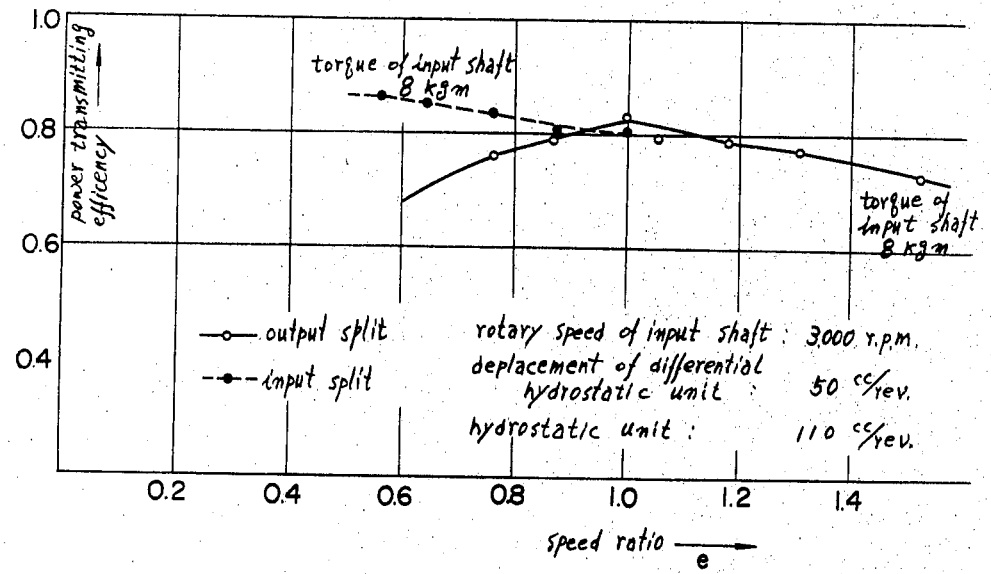
Figure 10:
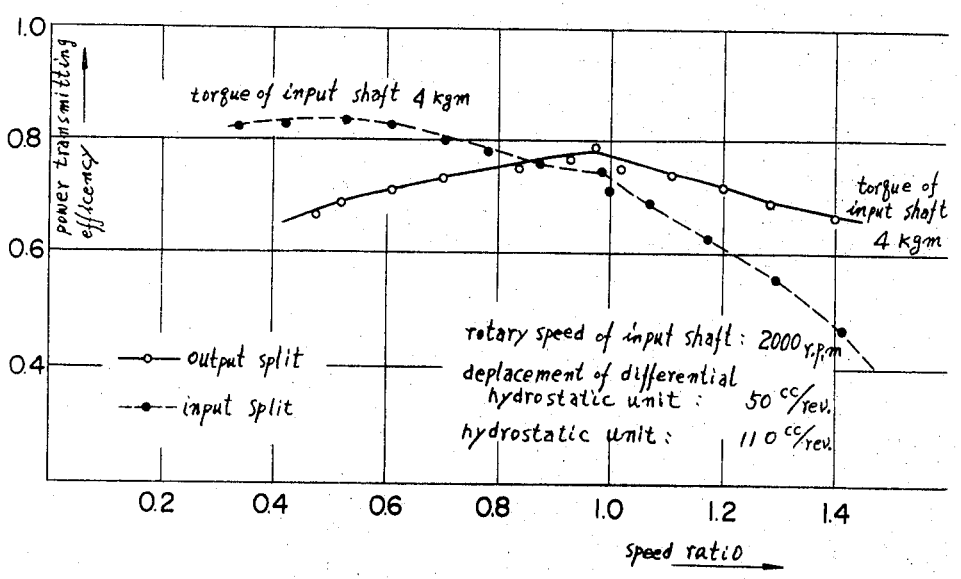
Figure 11:
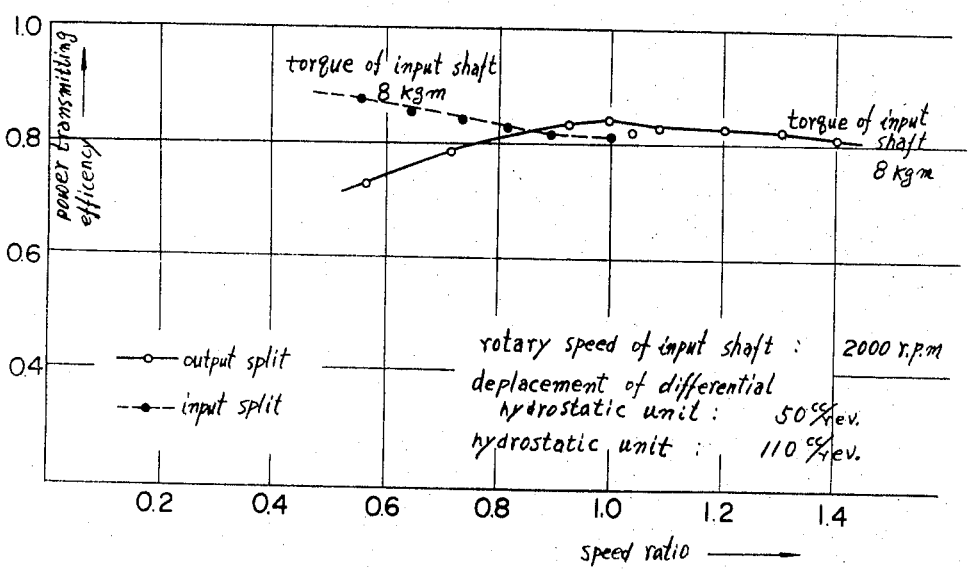
Figure 12:
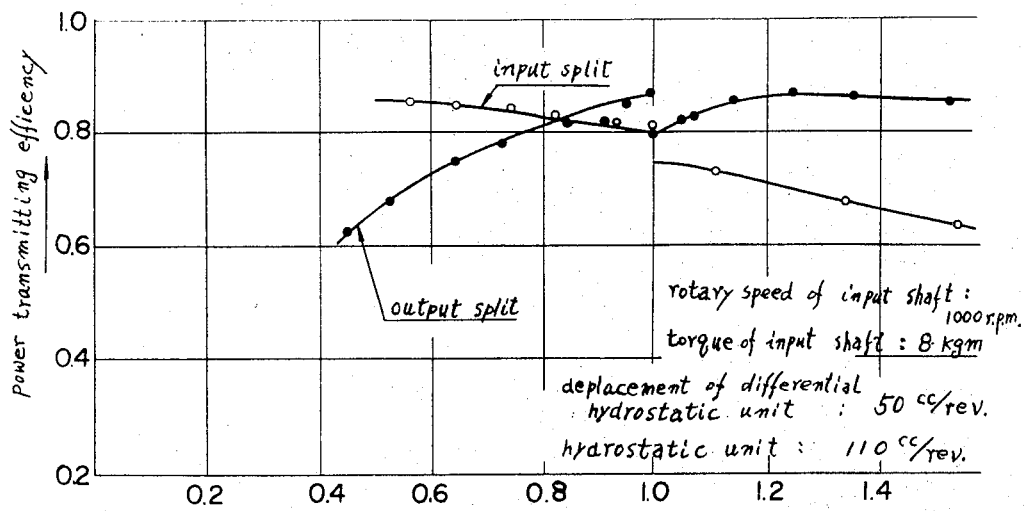
Figure 13:
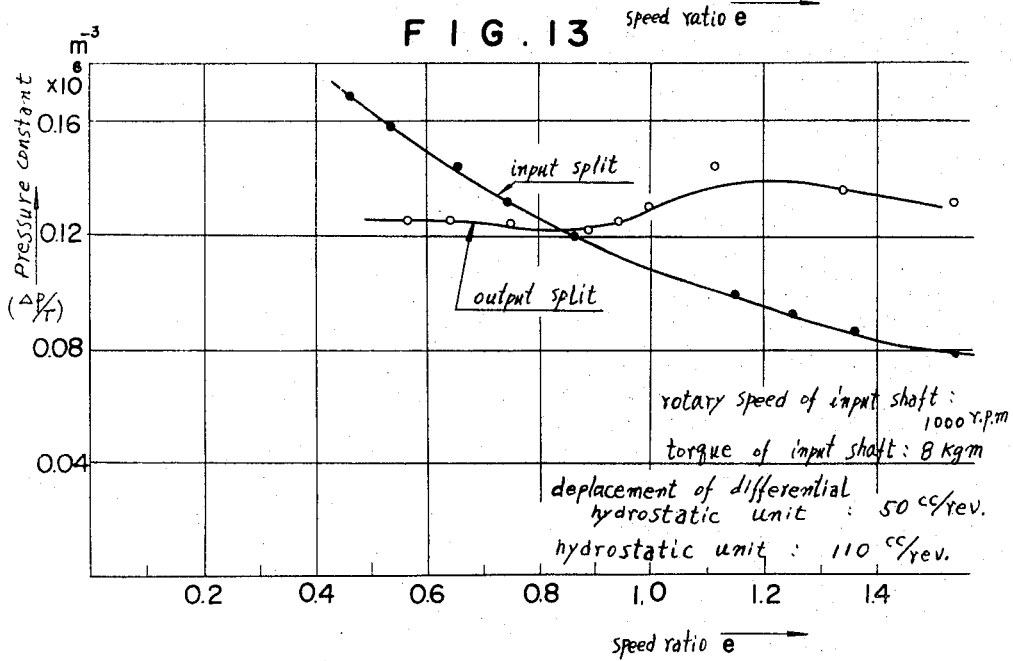
FIG. 13 is a pressure-speed ratio characteristic graph which is derived by experimentation.

Turning now to FIG. 7, there is shown a characteristic graph of the power transmitting efficiency of the input split-type system and the output split-type system which is corrected for the losses occurring at the point $e_c$. When considering power transmitting efficiency, it is preferable to convert from the input split-type to the output split-type system and the time for the opposite mode conversion $e^*$ is preferably the point $e_p$ and not the point $e_c$.

Figure 14:
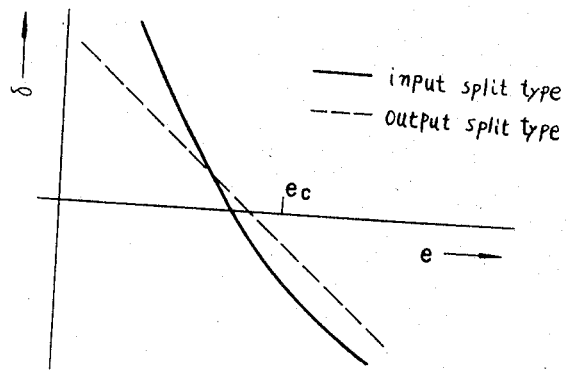
FIG. 14 is a displacement ratio-speed ratio characteristic graph in which liquid leakage losses are considered.

In FIGS. 8 to 13, the above facts are shown as a result of experiments conducted upon the input split-type and output split-type apparatus of FIG. 2. FIG. 14 is a displacement ratio $\delta$-speed ratio $e$ characteristic graph. When the speed ratio $e^*$ of the mode conversion is to be the speed ratio $e_p$ at which the transmitting efficiency of the input split-type apparatus is equal to that of the output split-type system, then the rotary speed of the differential hydrostatic unit will be equal to that of the other hydrostatic unit in both the input split-type and output split-type systems, at the point $e_p$. Accordingly, in order to attain an equal power transmitting efficiency $\eta$, the operational pressures of both systems are equal, as stated above.

The ratio $\delta$ of the displacements D of the differential hydrostatic unit and the other hydrostatic unit $\delta=D_N/D_S$ will now be considered. It is preferable that the displacement ratio $\delta_{in}$ of the input split-type system be equal to that ratio $\delta_{out}$ of the output split-type system. The displacement ratio $\delta$ is of course a function of the speed ratio $e$ in each of the input split-type and output split-type systems, and accordingly, a speed variation shock easily occurs when there is a difference in the displacement ratios $\delta$ at the time of mode conversion.

The displacement ratio $\delta$ is expressed as follows:

$$\delta_{in} = [(B-q_{in})/e - c] \cdot 1/iM_{in} \quad (11)$$

$$\delta_{out} = [(B-q_{out}) - c \cdot e] \cdot 1/iM_{out} \quad (12)$$

wherein B and c respectively represent constants determined by the design of the systems, and $$c \cdot e_c = B \quad (13)$$
$$q = \Delta Q/n_1 D_s .$$

It is preferable to maintain the speed ratio $e^*$ which occurs at the mode conversion at the value shown in equation (6).

When equation (6) is applied, equation (11) becomes modified as follows:

$$\delta_{in} = [(B-q_{in}) \cdot e^*/e - c \cdot e^*] 1/iM_{out} \quad (14)$$

Moreover, if $e^* = e_c$ as in the conventional cases, each displacement ratio $\delta$ is expressed as follows at the point $e = e_c$:

$$\delta_{in} = -q_{in}/iM \text{ out} \quad (15)$$
$$\delta_{out} = -q\text{ out}/iM \text{ out} \quad (16)$$

and since, as derived from equation (7), $$q_{in} > q_{out} \quad |q_{in}| > |q_{out}| \quad (17)$$

both $\delta$in and $\delta$out are negative. If the mode conversion point is to be $e_c$, a speed variation shock easily occurs and in addition, a shock due to the differential operation pressures also occurs.

Each displacement ratio $\delta$ at the speed ratio $e=e^*$ is expressed as follows, when the point $e$ is considered to be a discretional speed ratio. Consequently, the displacement ratio $\delta=\delta^*$ at such time is attained by substituting $e = e^*$ into the equations (12) and (14):

$$\delta in^* = (B - q_{in} - c \cdot e^*)/iM \text{ out} \quad (18)$$
$$\delta out^* = (B - q_{out} - c \cdot e^*)/iM \text{ out} \quad (19)$$

The condition zero speed variation shock, i.e., where $\delta in^* = \delta out^*$ is attained from the equations (18) and (19) as follows:

$$q_{in} = q_{out} \quad (20)$$

As stated above, equation (20) embodies the fact that $P_{in} = P_{out}$ which is attained at the point $e = e_p$ wherein the power transmtiting efficiency of the input split-type system is equal to that of the output split-type system. Similarly, the mode conversion point $e^*$ is determined to be the point $e_p$ wherein the displacements, the operational pressures, and the power transmitting efficiencies, or torque ratio of the transmission, are not substantially different, and moreover, the clutch is completely synchronized so that any conversion shocks can be completely prevented.

When the mode conversion point $e$ is within the range of $e_p < e^* < e_c$, the displacement ratio $\delta$in is different from the displacement ratio $\delta$out at the point $e^*$, and similarly for the instance where $e^* = e_c$. Accordingly, $e$ is changed by means of the mode conversion so as to effect a certain shock, however, the degree of change in $e$ by means of the mode conversion is less than that of $e^* = e_c$. Accordingly, the shock is less than that occurring when $e^* = e_c$, the shock being decreased as $e^*$ approaches $e_p$. Moreover, even when $e^* < e_p$, if $e^*$ appraoches $e_p$, the degree of change in $e$ by means of the mode conversion is less than that occurring at $e^* = e_c$. Accordingly, the shock caused by the mode conversion is less than that occurring at $e^* = e_c$.

Obviously, many modifications and variations of the present invention are possible in light of the above teachings. It is to be understood therefore that within the scope of the appended claims the present invention may be practiced otherwise than as specifically described herein.

What is claimed as new and desired to be secured by Letters Patent of the United States is:

1. An operation control method for a split-type hydrostatic power transmission connecting an input shaft to an output shaft through a differential hydrostatic unit, and selectively connecting another hydrostatic unit, connected to said differential hydrostatic unit by means of a hydrostatic circuit, to one of said input shaft and said output shaft by a switch connecting means, which comprises the steps of:

measuring the relation between the ratio of the displacement of said another hydrostatic unit to the displacement of said differential hydrostatic unit under liquid leakage conditions, and the ratio e of the rotary speed of said output shaft to the rotary speed of said input shaft, in each case wherein said another hydrostatic unit is connected to one of said input shaft and said output shaft; and switching the connection of said another hydrostatic unit from said one of said input shaft and said output shaft to the other of said input shaft and said output shaft at the time when said rotary speed ratio attains a variation value which is less than that of a reference speed ratio of zero of the rotary shafts associated with said differential hydrostatic unit.

2. The operation control method for a split-type hydrostatic power transmission as set forth in claim 1, wherein said connection of said another hydrostatic unit is switched from said one of said input shaft and said output shaft to the other of said input shaft and said output shaft at the time when said speed ratio $e$ is within the range of 0.75 $e_r \leq e < e_r$ wherein $e_r$ represents the reference speed ratio.

3. The operation control method for a split-type hydrostatic power transmission as set forth in claim 1, wherein said connection of said another hydrostatic unit is switched from said one of said input shaft and said output shaft to the other of said input shaft and said output shaft at the time when the power transmitting efficiency of said one of said input split-type transmission and said output split-type transmission is substantially equal to the power transmitting efficiency of the other of said input split-type transmission and said output split-type transmission prior to the speed ratio attaining the reference speed ratio.

4. The operation control method as set forth in claim 3, wherein said connection of said another hydrostatic unit is switched from said one of said input shaft and said output shaft to the other of said input shaft and output shaft at the time when the displacement ratio, operational pressures, and power transmitting efficiencies thereof are not substantially different.

5. The operation control method as set forth in claim 2, wherein said split-type hydrostatic power transmission is provided with suitable gearing having a suitable gear teeth ratio iM in/iM out, wherein iM in represents the gear teeth ratio of the output side and iM out represents the gear teeth ratio of the input side, for attaining said speed ratio.

* * * * *